No. 682,193. Patented Sept. 10, 1901.
C. O. HEGGEM.
BEATER FOR THRESHING MACHINES.
(Application filed Mar. 15, 1901.)
(No Model.)
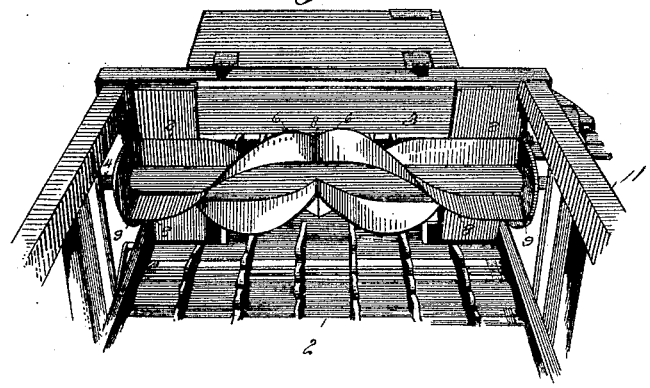
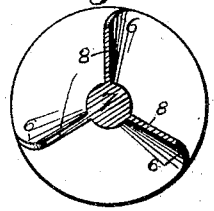
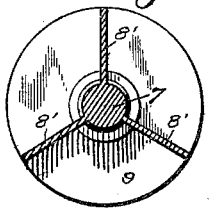
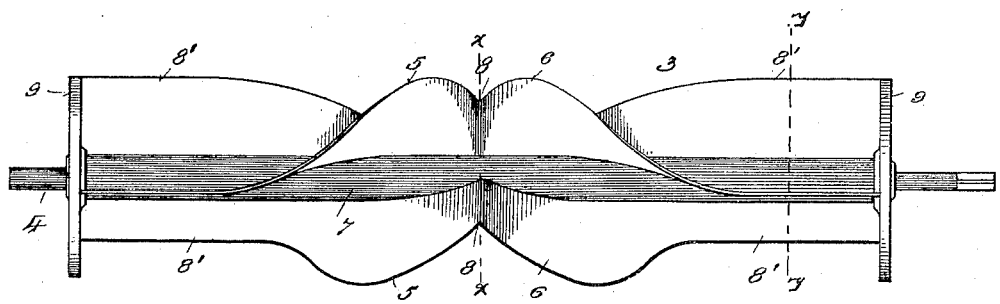
WITNESSES:
J. C. Dawley
Fred. McLaughlin
Charles O. Heggem,
INVENTOR,
By H. A. Toulmin
ATTORNEY.

UNITED STATES PATENT OFFICE.

CHARLES O. HEGGEM, OF MASSILLON, OHIO, ASSIGNOR TO RUSSELL & COMPANY, OF SAME PLACE.

BEATER FOR THRESHING-MACHINES.

SPECIFICATION forming part of Letters Patent No. 682,193, dated September 10, 1901.

Application filed March 15, 1901. Serial No. 51,280. (No model.)

*To all whom it may concern:*

Be it known that I, CHARLES O. HEGGEM, a citizen of the United States, residing at Massillon, in the county of Stark and State of Ohio, have invented certain new and useful Improvements in Beaters for Threshing-Machines, of which the following is a specification, reference being had therein to the accompanying drawings.

This invention relates to beaters for threshing-machines, and is in the nature of an improvement upon the invention set forth in Letters Patent No. 421,975, granted February 25, 1890, to Thomas H. Russell, for improvements in threshing-machines.

The present invention has for its object to increase the efficiency of the construction set forth in said prior Letters Patent; and to this end the invention consists in certain novel features, which I will now proceed to describe and will then specifically point out in the claims.

In the accompanying drawings, Figure 1 is a perspective view of a portion of a threshing-machine, showing my improved beater in position. Fig. 2 is an elevation of the beater detached. Fig. 3 is a sectional view of the beater, taken on the line $x\,x$ of Fig. 2; and Fig. 4 is a similar view taken on the line $y\,y$ of Fig. 2.

In the said drawings, 1 indicates the supporting-frame of a threshing-machine, and 2 a vibrating separating-table of any approved construction, said table being located in the rear of the threshing-cylinder, as fully set forth in the Letters Patent hereinbefore referred to. Above the front end of this separating-table is located the rotary beater 3, which is mounted on a shaft 4, which in turn is mounted in suitable bearings in the supporting-frame 1 and driven in any suitable manner. This beater is provided with a plurality of spirally-arranged blades 5 and 6, which are preferably formed on or secured to a cylindrical body 7, and each pair of blades meets at the center to form a separating-point 8, the pitch of the spirals being opposite from this central point toward each end of the beater. The construction thus described is substantially identical with that set forth in the Russell patent hereinbefore referred to. The spirals do not, however, extend to the ends of the beater, as in said earlier patent, but merge into straight radial blades 8', which extend from the spiral to the ends of the beater, which are preferably provided with disks 9, to which the ends of the blades are secured.

In operation it has been found that while the spiral portions of the wings or blades serve to effectually separate the straw as it comes from the cylinder and force it outward to the sides of the beater and table the flat radial end portions form wings or blades which give the straw a very violent shaking up and at the same time beat it vigorously against the table underneath, thereby materially promoting separation of the grain from the straw. In other words, the spiral central portion serves to spread laterally the bunched straw as it comes from the cylinder, and the straw thus forced laterally outward is thoroughly beaten and threshed by the radial wings of the beater at the sides thereof.

I do not wish to be understood as confining myself to the precise details hereinbefore set forth and shown in the drawings, as these details may obviously be modified without departing from the principle of my invention.

Having thus fully described my invention, what I claim as new, and desire to secure by Letters Patent, is—

1. A rotary beater for grain-separators having diverging spiral wings or blades of opposite pitch terminating at their outer ends in straight radial portions, substantially as described.

2. In a grain-separator for threshing-machines, the combination, with a separating-table, of a rotary beater located above that end of said table which receives the straw from the cylinder, said beater being provided with a plurality of diverging spiral wings or blades of opposite pitch, terminating at their outer ends in straight radial portions, substantially as described.

3. In a grain-separator for threshing-machines, the combination, with a separating-table, of a rotary beater located above that end thereof which receives the straw from the threshing-cylinder, said beater being provided with a plurality of pairs of spiral wings or blades of opposite pitch, meeting centrally in wedge form and terminating at their outer ends in straight radial portions, substantially as described.

In testimony whereof I affix my signature in presence of two witnesses.

CHARLES O. HEGGEM.

Witnesses:
WM. P. LAUGHLIN,
F. W. SCHAEFER.